(12) United States Patent
Van Stralen et al.

(10) Patent No.: US 9,339,044 B2
(45) Date of Patent: May 17, 2016

(54) APPARATUS FOR CARRYING OUT AN OPERATION ON SLAUGHTERED POULTRY

(71) Applicant: Meyn Food Processing Technology B.V.

(72) Inventors: Rick Sebastiaan Van Stralen, Oostzaan (NL); Aloysius Christianus Maria Van Steijn, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 14/791,640

(22) Filed: Jul. 6, 2015

(65) Prior Publication Data

US 2016/0007621 A1    Jan. 14, 2016

(30) Foreign Application Priority Data

Jul. 9, 2014   (NL) .................................... 2013154

(51) Int. Cl.
*A22C 21/00* (2006.01)
*A22C 21/06* (2006.01)

(52) U.S. Cl.
CPC ............. *A22C 21/06* (2013.01); *A22C 21/0046* (2013.01)

(58) Field of Classification Search
CPC . A22C 21/00; A22C 21/0046; A22C 21/0061
USPC ............. 452/74–77, 81, 83–91, 99, 106, 119, 452/173

See application file for complete search history.

(56) References Cited

U.S. PATENT DOCUMENTS

| | | | | |
|---|---|---|---|---|
| 4,283,813 A * | 8/1981 | House | ................ | A22C 21/0053 452/106 |
| 4,731,907 A * | 3/1988 | Tieleman | ............... | A22C 21/06 452/120 |
| 4,788,749 A * | 12/1988 | Hazenbroek | ........... | A22C 21/06 452/119 |
| 4,899,421 A * | 2/1990 | Van Der Eerden | | A22C 21/0061 452/106 |
| 4,918,787 A * | 4/1990 | Hazenbroek | ........... | A22C 21/06 452/116 |
| 7,537,515 B2 * | 5/2009 | Chattin | .................. | A22C 21/06 452/119 |
| 2002/0155803 A1 | 10/2002 | Tieleman | | |

FOREIGN PATENT DOCUMENTS

EP            1247453 B1    10/2002

* cited by examiner

*Primary Examiner* — Richard Price, Jr.
(74) *Attorney, Agent, or Firm* — Dority & Manning, P.A.

(57) ABSTRACT

An apparatus for carrying out an operation on slaughtered poultry, comprising suspension devices for suspending the poultry by the legs, a first drum which at its periphery is provided with a first curve formed by a first groove which is being traced by a first projection that connects to a first processing organ so as to arrange that movement of the first processing organ along the periphery of the first drum causes said first processing organ to be placed in an operational position with respect to the poultry being suspended by the legs. Further there are second processing device that cooperate with a second drum provided with a second curve formed by a second groove which is being traced by a second projection connected with the second processing device so as to arrange that by its movement along the periphery of the second drum said second processing device is positioned in its operational position with reference to the poultry. The apparatus further has the feature that the first drum and the second drum have an adjustable distance with respect to each other.

9 Claims, 5 Drawing Sheets

APPARATUS FOR CARRYING OUT AN OPERATION ON SLAUGHTERED POULTRY

PRIORITY STATEMENT

The present application claims priority under 35 U.S.C. §119 to Dutch Application No. 2013154, filed Jul. 9, 2014.

FIELD OF THE INVENTION

The subject matter of the present disclosure relates generally to an apparatus for carrying out an operation on slaughtered poultry, employing suspension devices for suspending the poultry by the legs while the operation is carried out.

BACKGROUND OF THE INVENTION

Various apparatus for carrying out an operation on slaughtered poultry are commonly used within the poultry processing industry. An example of such an apparatus, which particularly relates to the cleaning of the internal neck skin of slaughtered poultry, is known from EP-B-1 247 453. This known apparatus includes suspension devices for suspending the poultry by the legs, and a first drum which at its periphery is provided with a first curve formed by a first groove. The first groove is being traced by a first projection that connects to a rotatable organ bore so as to arrange that movement of the organ bore along the periphery of the first drum causes the organ bore to be inserted from the top into the poultry being suspended by the legs for carrying out the cleaning operation.

The apparatus of EP-B-1 247 453 further has presser means including a presser chock, which during the cleaning operation rests against the neck skin of the poultry at the breast side and pushes the neck skin of the poultry towards the organ bore. The presser chock cooperates with a second drum provided with a second groove that is being traced by a second projection connected with the pressure chock so as to arrange that the pressure chock is adjustable in height due to its movement along the periphery of the second drum. By arranging that the presser chock is adjustable in height, the pressure chock can be moved upwards at the beginning of the cleaning operation until it reaches a position wherein the pressure chock rests against the neck skin at the breast side of the poultry.

US2002/0155803 relates to a poultry processing machine in which two drums supported by a central tubular shaft are movable with respect to each other along the shaft. The two drums are provided with curves and are placed one over the other, the lower drum's curve being operable on a curve driven lifting mechanism to bring the poultry which is suspended in a conveyor line in a secured lifted position, and the upper drum's curve being operable on a curve driven processing tool, for instance a cutter embodied as a knife for making an opening cut in the body cavity of the carcass through the abdominal skin.

The preamble of the main claim therein reflects in general terms the systems that are known from EP-B-1 247 453 and from US2002/0155803, notably including suspension devices for suspending the poultry by the legs, a first drum which at its periphery is provided with a first curve formed by a first groove which is being traced by a first projection that connects to a first processing means so as to arrange that movement of the first processing means along the periphery of the first drum causes the first processing means to be placed in an operational position with respect to the poultry being suspended by the legs, and second processing means that cooperates with a second drum provided with a second curve formed by a second groove which is being traced by a second projection connected with the second processing means so as to arrange that by its movement along the periphery of the second drum the second processing means is positioned in its operational position with reference to the poultry.

Although this arrangement allows for a considerable tolerance with regard to any possible differences in size of the poultry to be processed, practice learns that poultry sizes may differ more than can be accommodated with the arrangement known from the apparatus of either EP-B-1 247 453 or US2002/0155803, and that inaccuracies may occur in the processing of the poultry, particularly in cases when the drums can occupy a variable relative position with respect to each other.

It is an object of the invention to accommodate for notable size differences of poultry.

It is another object of the invention to increase the accuracy of the apparatus according to the preamble, and to bring it to a level in which the processing accuracy is independent from the size of the poultry being handled.

It is still another object of the invention to generally provide suitable adjustment means usable in any type of apparatus for carrying out an operation on slaughtered poultry.

To promote that one or more of the objectives of the invention are met, the exemplary apparatus of the invention is embodied with one or more of the appended claims.

SUMMARY OF THE INVENTION

Aspects and advantages of the invention will be set forth in part in the following description, or may be obvious from the description, or may be learned through practice of the invention.

In a first exemplary aspect of the invention, the first drum and the second drum are rotationally adjustable with respect to each other. In this manner a perfect tuning in time can be accomplished as to when the first processing means must process the poultry, which may depend on the size of the poultry. Inaccuracies that may otherwise occur or remain due to the fact that the movements of the first processing means and the second processing means are independently determined by the trajectories of the grooves or curves in the first and second drums are thus effectively avoided.

It may be preferred that the first drum and the second drum have an adjustable distance with respect to each other. The adjustable distance of the first drum that is operably connected with the first processing means, in relation to the second drum that is operably connected with the second processing means, is an effective solution to accommodate the apparatus of the invention to an exceptionally large range of poultry sizes.

The relative position of the trajectories in the exemplary movable drums with respect to each other preferably has to be attuned to the size of the poultry, particularly with notable size differences of the poultry. In this connection, it is advantageous for realizing a high level of accuracy that the adjustable distance and/or the rotational position of the first drum and the second drum is/are continuously adjustable within a predefined range.

A suitable embodiment of the exemplary apparatus of the invention has the second drum mounted on a mechanism including at least two parts, wherein the two parts of the mechanism are adjustable regarding their mutual distance and regarding their rotational position with respect to each other.

Advantageously the two parts of the mechanism are connected with each other through actuators, preferably linear actuators. Preferably the actuators are hydraulic cylinders. Such hydraulic cylinders are simple and cost effective means to arrange for the mutual displacement of the two parts of the mechanism.

For this exemplary apparatus, it is further preferred that the second drum is mounted on a first axle of a first part of the mechanism which is rotatably mounted on a second part of the mechanism, which first axle cooperates with a rotationally fixed second axle which is further fixed against longitudinal displacement, and wherein the first axle and the second axle have a joint longitudinal body axis, wherein the first axle and the second axle have cooperating splines and projections to arrange that with variation of the distance of the two parts of the mechanism a longitudinal displacement of the first axle with respect to the second axle occurs causing a simultaneous rotation of the first axle with respect to the second axle.

In one embodiment of the invention the apparatus is applied for carrying out a cleaning operation on the internal neck skin of slaughtered poultry by removing the windpipe, gullet, glandular tissue or remainders thereof, wherein the first processing means is a rotatable organ bore so as to arrange that movement of the organ bore along the periphery of the first drum causes the organ bore to be inserted from the top into the poultry being suspended by the legs for carrying out the cleaning operation, and the second processing means includes a presser chock, which during the cleaning operation rests against the neck skin of the poultry at the breast side and pushes the neck skin of the poultry towards the organ bore, wherein the presser chock cooperates with the second drum so as to arrange that the pressure chock is adjustable in height by its movement along the periphery of the second drum.

The presser chock effectively assists the scraping action of the organ bore so that its efficacy is improved. The presser chock pushing the poultry's neck skin on the breast side towards the organ bore assists in particular the effective removal of the windpipe, which, due to the nature of the tissue of which the windpipe consists, is usually difficult to remove by means of the organ bore.

Although the measure with which the neck skin is pressed against the organ bore is as such quite critical, since on the one hand the scraping action of the organ bore needs to be supported, while on the other hand the scraping action must not result in the neck skin being torn, use of the apparatus of the invention improves the scraping action and ensures that poultry of any size is stripped reliably of windpipe, gullet and other tissue that is to be removed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention. The invention will now be explained in more detail with reference to the figures illustrating non-limiting exemplary embodiments.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
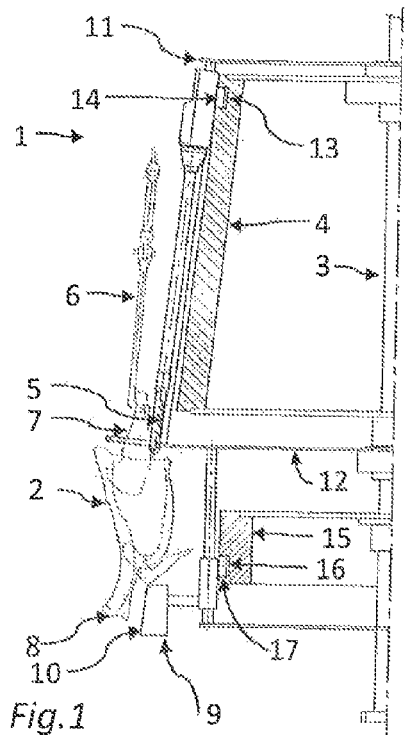
FIGS. 1 to 4 illustrate a number of successive settings of a first exemplary embodiment of an apparatus according to the invention, which is arranged for carrying out a cleaning operation applied to the internal neck skin of slaughtered poultry.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

The exemplary apparatus 1 shown in FIGS. 1 through 4 is intended for carrying out a cleaning operation applied to the internal neck skin of slaughtered poultry 2. Apparatus 1 includes a first drum 4 and a central axis 3 pertaining to the first drum 4. Along the first drum 4 movable organ bores 5 are provided. One such organ bore 5 is shown in FIGS. 1-4. To facilitate their activation, the organ bores are in their longitudinal direction movably mounted on rods, which are fastened to an upper plate 11 and a lower plate 12, rotatable about the axis 3.

The upper plate 11 may, for example, be driven by a chain such that the organ bores 5 are moved along the drum 4. The periphery of the first drum 4 is provided with a curve formed by a first groove 13, which is being traced by a first projection 14 that is part of the organ bore 5. In this way the movement of the organ bore 5 along the first drum 4 also results in the organ bore 5 making a movement in its longitudinal direction determined by the curve of the first groove 13, while at the same time a further mechanism causes the organ bore 5 to rotate during the longitudinal movement.

As further shown in FIGS. 1-4, the poultry 2 is suspended by the legs from suspension devices 6, for example, hooks.

While the poultry 2 is suspended by the legs 7 from the hooks, moving in correspondence with the movement of the organ bores 5 along the first drum 4, the organ bore 5 is activated in the manner explained above as soon as the same moves from the top into the poultry 2 (see FIG. 1 and FIG. 2, respectively), after which it moves such as to exit the poultry 2 via a neck end 8.

The apparatus is further provided with presser means 9 in the form of a presser chock, which is placed from below, against the neck skin of the poultry 2 at the breast side. In this position, which is illustrated in FIG. 2, the presser chock 9 pushes the neck skin of the poultry towards the organ bore 5 such as to enable the latter to effectively scrape the inside of the neck skin of the poultry 2.

With the presser chock 9 supporting the neck skin from the outside, the internal neck skin can be effectively cleaned when the neck opening 8 is very large, thereby also allowing difficult tissue to be removed. This relates in particular to the windpipe.

Figure 2:
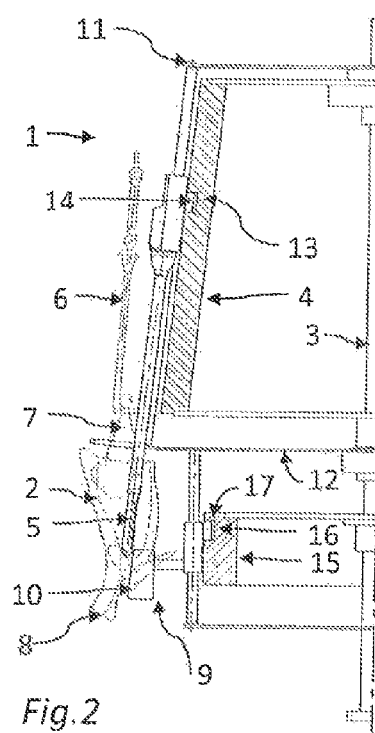
Figure 3:
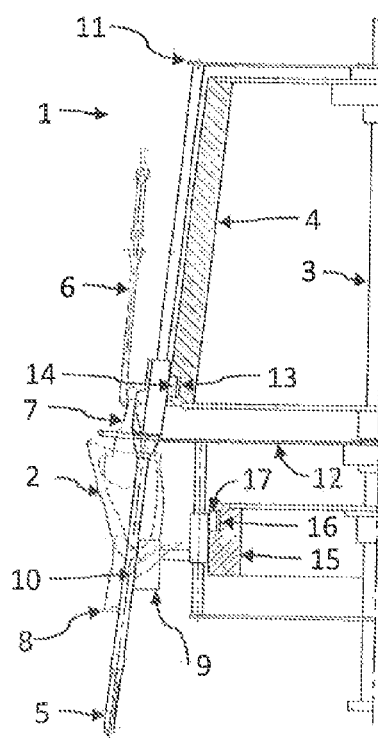

FIGS. 2 and 3 show that a small space remains between the organ bore 5 and the presser chock 9, between which the neck skin of the poultry 2 can be accommodated so that the cleaning operation to be carried out with the organ bore 5 will not damage the neck skin.

The figures show that the organ bore 5 is disposed at a slight slant. The presser chock 9 has a work surface 10 that corresponds with the slanting disposition of the organ bore 5. In an equally possible completely perpendicular disposition of the organ bore 5, the work surface 10 of the presser chock 9 should be disposed correspondingly perpendicular.

FIGS. 2 and 3 show the situation following the start of the cleaning operation, when the organ bore 5 is moving downwards and the presser chock 9 is moved upwards from the initial position shown in FIG. 1, until it assumes a position wherein the presser chock 9 rests against the neck skin at the breast side of the poultry, supporting the same. This is caused by the arrangement that the presser chock 9 cooperates with a second drum 15 provided with a second groove 16, which is being traced by a second projection 17 connected with the pressure chock 9. By this arrangement the pressure chock 9 is automatically adjusted in height when it moves past the periphery of the second drum 15.

Figure 4:
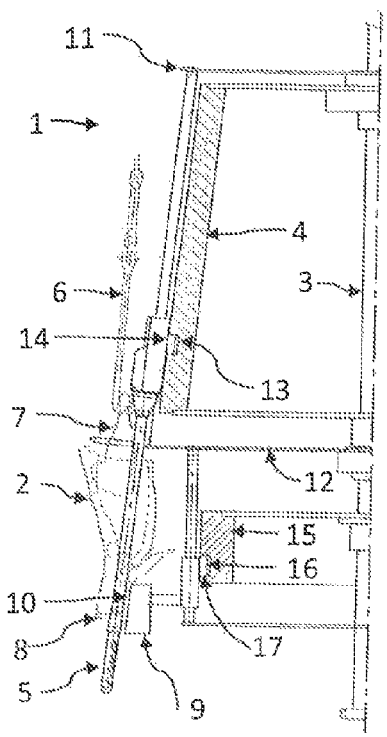

FIG. 4 shows that the organ bore 5 has completed the cleaning operation after which it will return to the starting position as shown in FIG. 1. In that situation the presser chock 9 is also returned to the initial position of FIG. 1, so that the poultry 2 is then again suspended from the hooks 6 by the legs 7 only.

Figure 5:
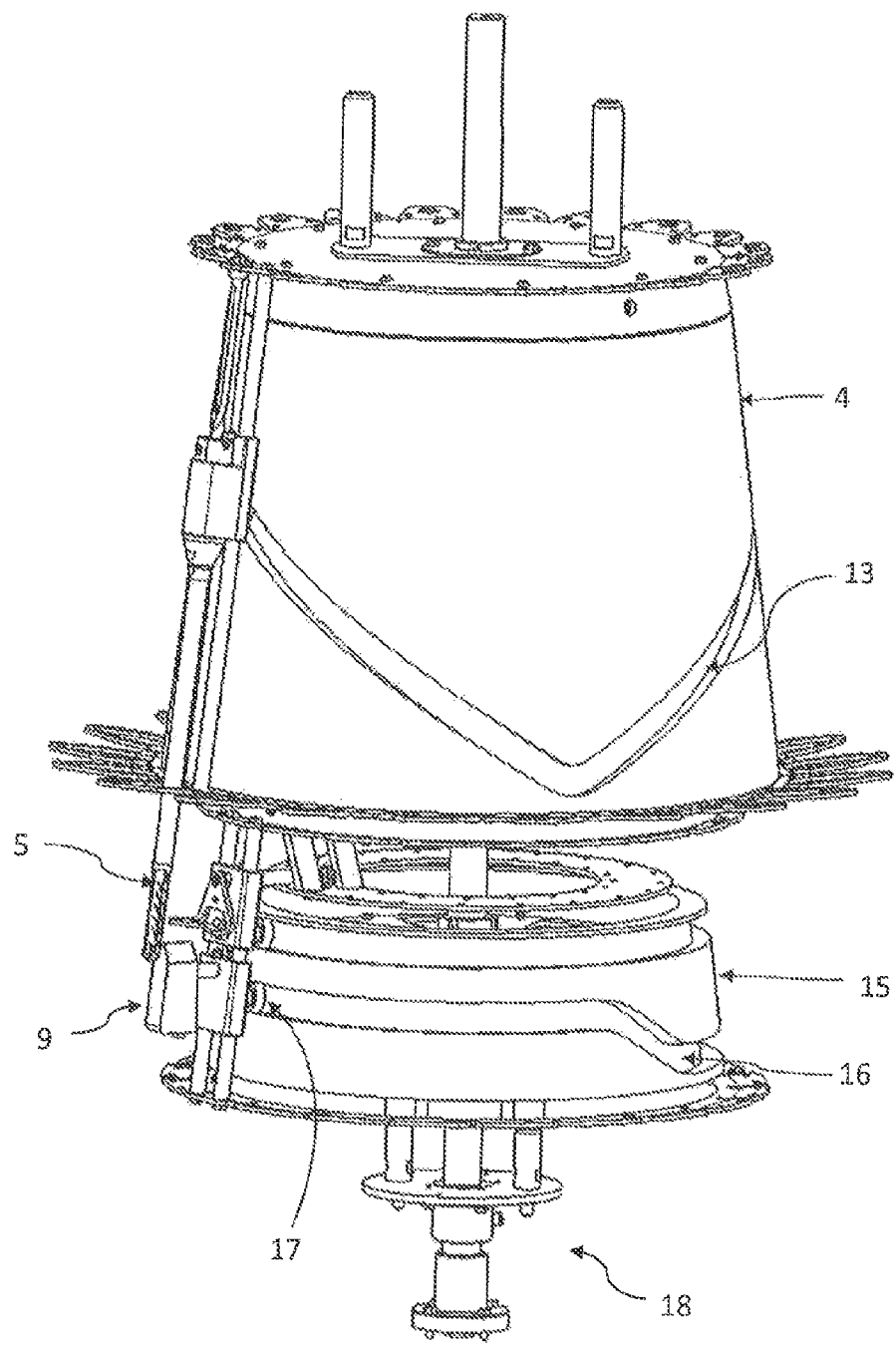
FIG. 5 shows in an isometric side view the two drums of the exemplary apparatus of the invention shown in FIGS. 1 through 4.

FIG. 5 provides an isometric side view of the apparatus 1 of the invention shown in FIGS. 1-4, providing a clearer view at the first drum 4 which at its periphery is provided with a first curve formed by a first groove 13. This groove 13 is traced by a first projection (not visible) that connects to a rotatable organ bore 5 in order to arrange that when the organ bore 5 moves along the periphery of the first drum 4, the organ bore 5 is moved downwards and inserted from the top into the poultry to be processed. Likewise after the poultry is processed, the organ bore 5 moves upwards again.

FIG. 5 also provides a clear view at the presser chock 9 that cooperates with a second drum 15 that is provided with a second curve formed by a second groove 16. This second groove 16 is being traced by a second projection 17 connected with the pressure chock 9 so as to arrange that the pressure chock 9 is adjustable in height due to its movement along the periphery of the second drum 15.

Figure 6B:
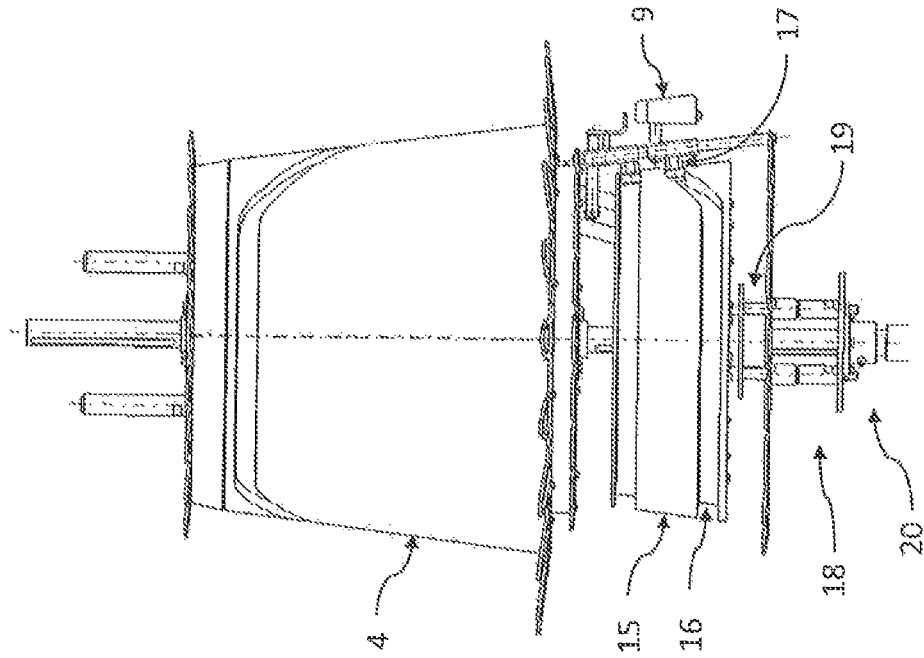
FIGS. 6A and 6B show in a detail side view the drum operably connected with the pressure chock at a first and at a second altitude.
Figure 6A:
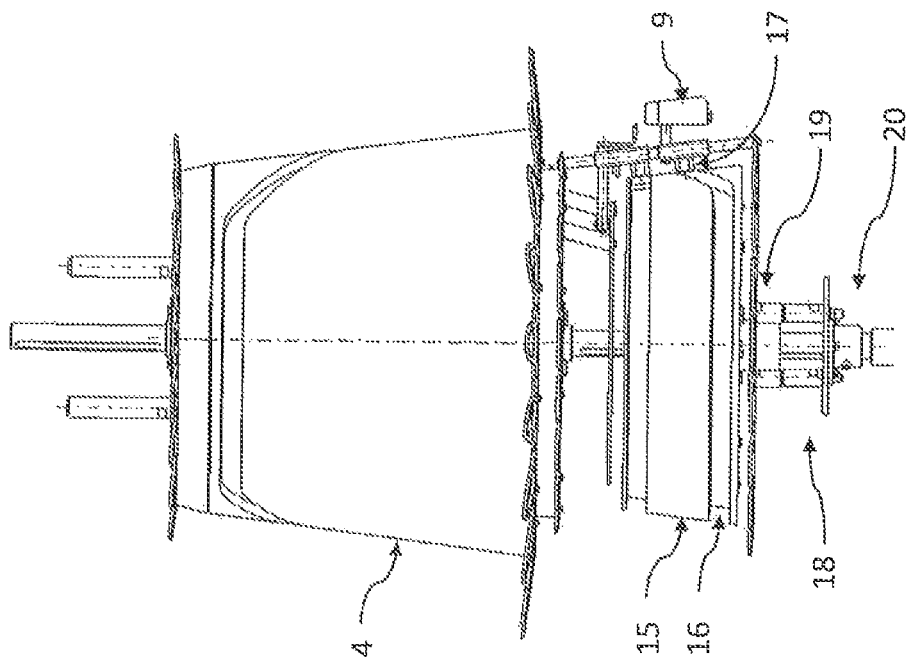

According to the invention the first drum 4 and the second drum 15 have an adjustable distance with respect to each other as is illustrated in FIGS. 6A and 6B. Comparing FIG. 6A with FIG. 6B reveals that the second drum 15 that is operably connected with the pressure chock 9 assumes a lower position in FIG. 6A than it does in FIG. 6B. With the first drum 4 being at a fixed altitude with reference to the fixed world, this brings about that the distance between the first drum 4 that connects to the rotatable organ bore 5, and the second drum 15 that connects to the pressure chock 9 is variable. Preferably at the same time the first drum 4 and the second drum 15 are rotationally adjustable with respect to each other.

Both FIGS. 6A and 6B show an exemplary embodiment in which the second drum 15 is mounted on a mechanism 18 comprising at least two parts 19, 20, wherein the two parts of the mechanism 18 are adjustable regarding their mutual distance and regarding their rotational position with respect to each other. This is also shown in FIG. 7.

Figure 7:
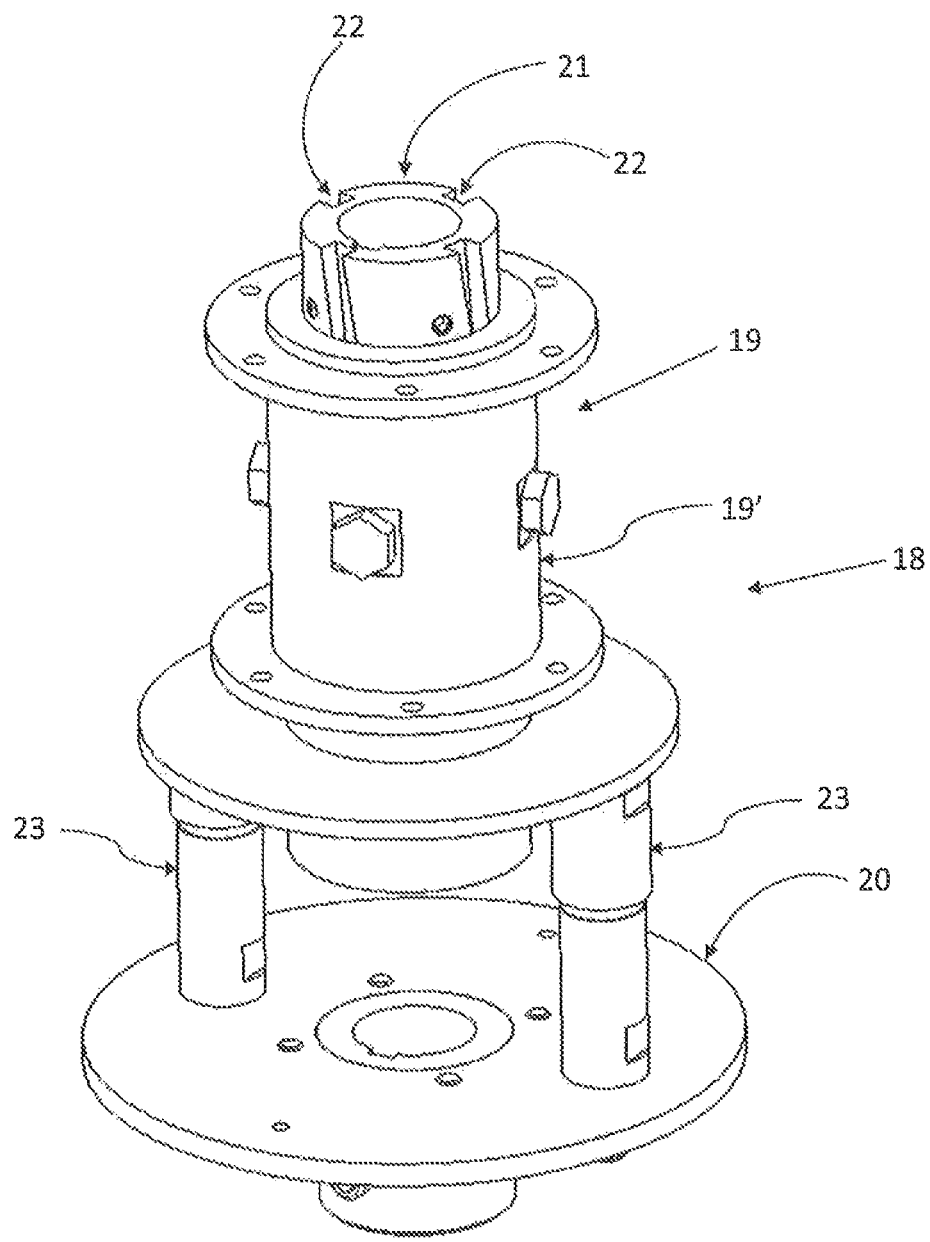
FIG. 7 shows an isometric view of the exemplary mechanism which is preferably used for mounting the drum that is operably connected with the pressure chock.

FIG. 7 shows that the two parts 19, 20 of the mechanism 18 are connected with each other through (preferably linear) actuators 23, particularly hydraulic cylinders. The mechanism 18 includes a first axle 19' of a first part 19 of the mechanism 18 on which the second drum 15 is to be mounted. The first part 19 is rotatably mounted on a second part 20 of the mechanism 18. The first axle 19' of the first part 19 further cooperates with a rotationally fixed second axle 21 which is also fixed against longitudinal displacement. FIG. 7 further shows that the first axle 19' and the second axle 21 have a joint longitudinal body axis and cooperating splines 22 and (non-visible) projections to arrange that with variation of the distance of the two parts 19, 20 of the mechanism 18, a longitudinal displacement of the first axle 19' with respect to the second axle 21 occurs causing a simultaneous rotation of the first axle 19' with respect to the second axle 21. Due to the fact that the second drum 15 is mounted on the first axle 19', varying the distance between the first part 19 and the second part 20 of the mechanism 18 results in a simultaneous variation of the altitude of the second drum 15 and of its rotational position with reference to the fixed axle 21. In this way a very effective and robust apparatus is provided that can be accommodated to processing of poultry in a large range of sizes.

Figure 8A:
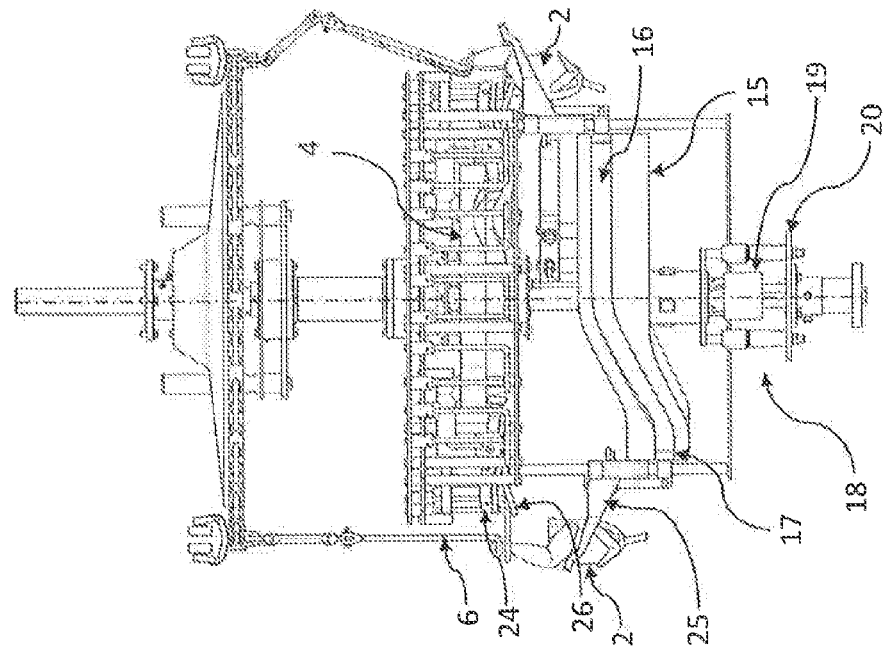
FIGS. 8A and 8B show another exemplary embodiment of an apparatus according to the invention that is usable for processing poultry to open poultry carcasses at the vent side.
Figure 8B:
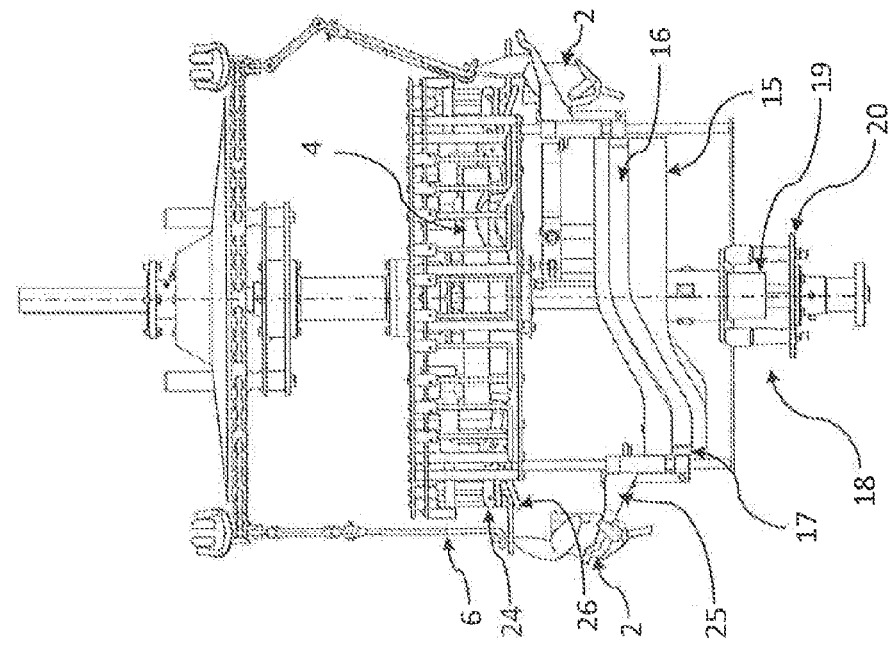

FIGS. 8A and 8B show another exemplary embodiment of the apparatus according to the invention, which can be used for opening the body cavity of a slaughtered bird. In such an apparatus, which is of the type disclosed in EP-A-0 761 100, the object is to open the body cavity of the poultry starting from the cloaca while preventing that the intestines are cut. The problem is however that not all poultry has the same size. During operation of the apparatus rod 26 cooperates with cutting device 24. The cutting device 24 cuts the abdominal skin once rod 26 has been pushed inside the cloaca to its foremost position. The apparatus of FIGS. 8A/8B is construed to arrange that depending on the size of the poultry the positioning unit 25 is adjusted from its lowest position shown in FIG. 8A to its highest position shown in FIG. 8B. This is realized by arranging that the two parts 19, 20 of the mechanism 18 as shown in FIG. 7 are applied together with the first drum 4 and the second drum 15 shown in FIGS. 8A and 8B. The first groove in the drum 4 and the first projection that cooperates with the cutting device 24 (the first processing means) is not shown, yet a clear view is provided to the second groove 16 in the second drum 15 and the second projection 17 that cooperates with the second groove 16 and connects to the positioning unit 25 (the second processing means). In this way the timing of the positioning unit 25 reaching its top position is automatically secured, so that an optimal positioning of the poultry is obtained to ensure a precise cut of the skin while cutting the intestines is prevented.

Although the invention has been discussed in the foregoing with reference to exemplary embodiments of the apparatus of the invention, the invention is not restricted to these particular embodiments which can be varied in many ways without departing from the gist of the invention. It is for instance possible to provide a fixed altitude for the second drum, and make the first drum that is operably connected with the rotatable organ bore variable in height and rotational position with reference to the second drum. The discussed exemplary embodiments shall therefore not be used to construe the appended claims strictly in accordance with these embodiments. On the contrary, the exemplary embodiments are merely intended to explain the wording of the appended claims without intent to limit the claims to their particular features. The scope of protection of the invention shall therefore be construed in accordance with the appended claims only, wherein a possible ambiguity in the wording of the claims shall be resolved using the exemplary embodiments.

What is claimed is:

1. An apparatus for carrying out an operation on slaughtered poultry, comprising:
    suspension devices for suspending the poultry by legs of the poultry;
    a first drum having a periphery provided with a first curve formed by a first groove that is traced by a first projection that connects to a first processing means so as to arrange that movement of the first processing means along the periphery of the first drum causes the first processing means to be placed in an operational position with respect to the poultry being suspended by the legs, and
    second processing means that cooperates with a second drum provided with a second curve formed by a second groove which is being traced by a second projection connected with the second processing means so as to arrange that by its movement along the periphery of the second drum the second processing means is positioned in its operational position with reference to the poultry;
    wherein the first drum and the second drum are rotationally adjustable with respect to each other.

2. The apparatus for carrying out an operation on slaughtered poultry as in claim 1, wherein the first drum and the second drum have an adjustable distance with respect to each other.

3. The apparatus for carrying out an operation on slaughtered poultry as in claim 1, wherein the second drum is mounted on a mechanism comprising at least two parts, wherein the two parts of the mechanism are adjustable regarding their mutual distance and regarding their rotational position with respect to each other.

4. The apparatus for carrying out an operation on slaughtered poultry as in claim 3, wherein the adjustable distance, the rotational position, or both, of the first drum and the second drum is continuously adjustable within a predefined range.

5. The apparatus for carrying out an operation on slaughtered poultry as in claim 3, wherein the two parts of the mechanism are connected with each other through actuators.

6. The apparatus for carrying out an operation on slaughtered poultry as in claim 3, wherein the two parts of the mechanism are connected with each other through linear actuators.

7. The apparatus for carrying out an operation on slaughtered poultry as in claim 6, wherein the actuators are hydraulic cylinders.

8. The apparatus for carrying out an operation on slaughtered poultry as in claim 3, wherein the second drum is mounted on a first axle of a first part of the mechanism which is rotatably mounted on a second part of the mechanism, which first axle cooperates with a rotationally fixed second axle that is further fixed against longitudinal displacement, wherein the first axle and the second axle have a joint longitudinal body axis and wherein the first axle and the second axle have cooperating splines and projections to arrange that with variation of the distance of the two parts of the mechanism a longitudinal displacement of the first axle with respect to the second axle occurs causing a simultaneous rotation of the first axle with respect to the second axle.

9. The apparatus for carrying out an operation on slaughtered poultry as in claim 1, wherein the apparatus is arranged for carrying out a cleaning operation on the internal neck skin of slaughtered poultry by removing the windpipe, gullet, glandular tissue or remainders thereof, wherein the first processing means is a rotatable organ bore so as to arrange that movement of the organ bore along the periphery of the first drum causes the organ bore to be inserted from the top into the poultry being suspended by the legs for carrying out the cleaning operation, and the second processing means comprise a presser chock, which during the cleaning operation rests against the neck skin of the poultry at the breast side and pushes the neck skin of the poultry towards the organ bore, wherein the presser chock cooperates with the second drum so as to arrange that the pressure chock is adjustable in height by its movement along the periphery of the second drum.

* * * * *